US010116395B2

(12) United States Patent
Hwang et al.

(10) Patent No.: US 10,116,395 B2
(45) Date of Patent: Oct. 30, 2018

(54) PHOTONIC MICROWAVE MIXING APPARATUS AND METHOD THEREOF

(71) Applicant: NATIONAL CHENG KUNG UNIVERSITY, Tainan (TW)

(72) Inventors: Sheng-Kwang Hwang, Tainan (TW); Yu-Han Hung, Chiayi (TW)

(73) Assignee: National Chung Cheng University, Tainan (TW)

( * ) Notice: Subject to any disclaimer, the term of this patent is extended or adjusted under 35 U.S.C. 154(b) by 0 days.

(21) Appl. No.: 15/432,037

(22) Filed: Feb. 14, 2017

(65) Prior Publication Data
US 2018/0048393 A1    Feb. 15, 2018

(30) Foreign Application Priority Data
Aug. 12, 2016  (TW) .............................. 105125868 A

(51) Int. Cl.
H04B 10/50      (2013.01)
H04B 10/564     (2013.01)
(Continued)

(52) U.S. Cl.
CPC ........... H04B 10/564 (2013.01); G02F 1/353 (2013.01); H04B 10/2575 (2013.01);
(Continued)

(58) Field of Classification Search
CPC .......................... H04B 10/50–10/588; H04B 10/2543–10/25759; G02F 1/353–1/3538
(Continued)

(56) References Cited

U.S. PATENT DOCUMENTS 5,710,651 A  *  1/1998  Logan, Jr. .............. H03B 28/00
                                              398/106
6,889,008 B2 *  5/2005  Ogusu ............... H04B 10/25758
                                              398/183
(Continued)

FOREIGN PATENT DOCUMENTS

TW          201519588    *   5/2015    ......... H04B 10/2575

OTHER PUBLICATIONS

Hung et al: "Photonic microwave stabilization for period-one nonlinear dynamics of semiconductor lasers using optical modulation sideband injection locking", Optics Express, vol. 23, No. 5, Mar. 2, 2015, pp. 6520-6532.*

Primary Examiner — Li Liu
(74) Attorney, Agent, or Firm — Wang Law Firm, Inc.

(57) ABSTRACT

A photonic microwave mixing apparatus and method thereof are disclosed. An optical input carrying a frequency-to-be-converted microwave signal is injected into a photonic microwave mixing module of the photonic microwave mixing apparatus, wherein the photonic microwave mixing module includes a microwave mixing laser. The optical power and carrier frequency of the optical input are adjusted so as to place the microwave mixing laser in period-one nonlinear dynamics, and, at the same time, to achieve frequency-unlocking between the oscillation sidebands of the period-one nonlinear dynamics and the modulation sidebands of the optical input. Under such operation, the microwave mixing laser emits a nonlinear wave-mixing optical signal. Properly selecting the frequency components of the nonlinear wave-mixing optical signal through an optical frequency component selector generates an optical output carrying a frequency-converted microwave signal, therefore achieving microwave frequency conversion.

9 Claims, 15 Drawing Sheets

(51) Int. Cl.
*H04B 10/2575* (2013.01)
*G02F 1/35* (2006.01)
*H04B 10/516* (2013.01)

(52) U.S. Cl.
CPC ......... *H04B 10/501* (2013.01); *H04B 10/503* (2013.01); *H04B 10/516* (2013.01); *H04B 2210/006* (2013.01)

(58) Field of Classification Search
USPC .................................................. 398/182–201
See application file for complete search history.

(56) References Cited

U.S. PATENT DOCUMENTS

| | | | |
|---|---|---|---|
| 7,933,524 B2* | 4/2011 | Park | H04B 1/04 398/182 |
| 9,287,993 B1* | 3/2016 | Adleman | H04B 10/2575 |
| 2002/0146046 A1* | 10/2002 | Kim | H01S 5/06213 372/20 |
| 2003/0027586 A1* | 2/2003 | Johnson | G01V 8/005 455/517 |
| 2007/0091941 A1* | 4/2007 | Mori | H01S 3/06754 372/18 |
| 2007/0212074 A1* | 9/2007 | Park | H04B 1/04 398/183 |
| 2011/0044692 A1* | 2/2011 | Chan | H04B 10/25752 398/115 |
| 2014/0270783 A1* | 9/2014 | Prather | H04B 10/25752 398/115 |
| 2015/0244331 A1* | 8/2015 | Hwang | H03F 3/08 330/308 |
| 2015/0280830 A1* | 10/2015 | Hwang | H04B 10/5165 398/147 |

* cited by examiner

PHOTONIC MICROWAVE MIXING APPARATUS AND METHOD THEREOF

CROSS-REFERENCE TO RELATED APPLICATION

This application claims priority from Taiwan Patent Application No. 105125868, filed on Aug. 12, 2016 in Taiwan Intellectual Property Office, the contents of which are hereby incorporated by reference in their entirety.

BACKGROUND OF THE INVENTION

1. Field of the Invention

The present invention relates to a photonic microwave mixing apparatus and method thereof by using, particularly, period-one nonlinear dynamics of semiconductor lasers.

2. Description of the Related Art

According to the statistics released by a leading telecommunication manufacturer, Cisco Systems, Inc, the data traffic of the global wireless communication has reached an average close to 3.7 million terabytes per month in 2015 and will continue to grow at a compound annual rate of 53% in the following years. In order to meet such a huge data traffic demand, telecommunication operators and manufacturers have proposed two solutions. On one hand, they have proposed to use high-frequency microwave signals as carriers (for example, Samsung and Nokia have proposed to use 28 and 70 GHz, respectively) for the next-generation wireless communication systems, such as 5G or beyond, to provide a communication bandwidth of 1000 times more than that of the current systems. On the other hand, they have proposed to adopt a new wireless communication access network architecture, the so-called radio-over-fiber network, which combines the advantages of both wireless communication and optical fiber communication to significantly enhance the communication capacity and also to considerably expand the communication coverage for the next-generation wireless communication systems.

As opposed to the present wireless communication access network, more than 80% of the microwave signal processing functionalities in the radio-over-fiber network will be carried out at central offices (or baseband processing offices) instead of remote base stations. Key microwave signal processing functionalities include (1) how to first convert low-frequency microwave signals to high-frequency microwave signals, a process called frequency upconversion, at central offices and next distribute the frequency-converted microwave signals through optical fibers to remote base stations for wireless radiation using antennas for downlink transmission, and (2) how to convert high-frequency microwave signals, which are first received by antennas at remote base stations and next transmitted to central offices through optical fibers, to low-frequency microwave signals, a process called frequency downconversion, at central offices for data retrieval and analysis using photodetectors with narrow bandwidth, low cost, and high output power for uplink transmission. These two key microwave signal processing functionalities can be achieved using photonic microwave mixing apparatuses. Compared with electronic microwave mixing apparatuses, photonic microwave mixing apparatuses enable frequency upconversion and downconversion over a broad spectral range, block the interaction between frequency-to-be-converted microwave signals and microwave local oscillators, and avoid electromagnetic interference. Consequently, the needs for high-frequency electronic microwave devices and equipment are largely reduced and the restriction on high-frequency upconversion or downconversion due to the limited bandwidth of electronic devices are considerably relaxed.

Three commonly adopted photonic microwave mixing apparatuses and methods for frequency upconversion and downconversion are briefly described as follows:

(1) Dual-series Modulators:

This method utilizes an optical modulator to superimpose a microwave signal at $f_0$, generated by an electronic microwave local oscillator, onto an optical signal carrying a frequency-to-be-converted microwave signal at $f_m$ in order to generate a wave-mixing optical signal. An optical filter is applied to select the desired optical frequency components, which are separated from each other by $|f_m-f_0|$, of the wave-mixing optical signal. An optical signal carrying a frequency-converted microwave signal at $|f_m-f_0|$ is therefore obtained, achieving microwave frequency conversion from $f_m$ to $|f_m-f_0|$. One key advantage of this method is that the frequency-converted microwave signal has high spectral stability and purity. However, since an electronic microwave local oscillator is required, high-frequency microwave mixing may not be available due to the bandwidth limitation of the electronic microwave local oscillator. In addition, since a high output power from the electronic microwave local oscillator is required for high conversion efficiency and an optical power amplifier is needed to compensate for the significant power loss after the process of the optical filtering, the system power consumption is considerably high.

(2) Dual-parallel Modulators:

This method adopts an optical modulator to superimpose a microwave signal at $f_0$, generated by an electronic microwave local oscillator, onto a continuous-wave optical signal. This optical signal is used to destructively interfere with another optical signal carrying a frequency-to-be-converted microwave signal at $f_m$ so that the optical carriers of both optical signals are removed or suppressed. An optical signal carrying a frequency-converted microwave signal at $|f_m-f_0|$ is obtained accordingly, achieving microwave frequency conversion from $f_m$ to $|f_m-f_0|$. Key advantages of this method include that the frequency-converted microwave signal has high spectral stability and purity, no optical filter is required, and the optical modulation depth of the resulting optical signal can be adjusted to enhance the conversion efficiency. However, one major disadvantage of this method is that a highly precise optical phase difference between the two interfering optical signals is needed, which requires high stability of the conversion system against ambient variations and system adjustments. In addition, since a high-power electronic microwave local oscillator is required for high conversion efficiency, not only high-frequency microwave mixing may not be available due to the bandwidth limitation of the electronic microwave local oscillator, but also the system power consumption is considerably high.

(3) Cross-gain Modulation:

This method takes advantages of the cross-gain modulation effect that happens inside a semiconductor optical amplifier when two optical signals carrying microwave signals at $f_m$ and $f_0$, respectively, are simultaneously sent through the semiconductor optical amplifier in order to generate a wave-mixing optical signal. An optical filter is applied to select the desired optical frequency components, which are separated from each other by $|f_m-f_0|$, of the wave-mixing optical signal. An optical signal carrying a frequency-converted microwave signal at $|f_m-f_0|$ is therefore obtained, achieving microwave frequency conversion from $f_m$ to $|f_m-f_0|$. One key advantage of this method is that the frequency-converted microwave signal has high spectral stability and purity. However, since an electronic microwave local oscillator is required, high-frequency microwave mixing may not be available due to the bandwidth limitation of the electronic microwave local oscillator. In addition, since a high output power from the electronic microwave local oscillator is required for high conversion efficiency and an optical power amplifier is needed to compensate for the significant power loss after the process of the optical filtering, the system power consumption is considerably high.

SUMMARY OF THE INVENTION

According to the problems and challenges encountered in prior arts, the purpose of the present invention is to provide an apparatus and a method for microwave mixing (or sometimes refer to as microwave frequency conversion) based on period-one nonlinear dynamics of a semiconductor laser. Only a typical and commercially available semiconductor laser is required as the key component, which could be a Fabry Perot laser, a distributed feedback laser, a vertical cavity surface emitting laser, a quantum-well laser, a quantum-dash laser, or a quantum-dot laser. No specific or high-speed semiconductor laser is necessary to carry out microwave mixing using the period-one nonlinear dynamics of the semiconductor laser. The method of the present invention is to inject an optical input, which is an optical signal carrying a frequency-to-be-converted microwave signal at $f_m$ generated by a microwave-modulated optical signal generation module, into the semiconductor laser under a proper injection frequency and a proper injection power so that the semiconductor laser is operated at the period-one nonlinear dynamics. Since the optical power of the period-one nonlinear dynamics varies periodically with an oscillation frequency, $f_0$, which falls within the range of the microwave band, the semiconductor laser operating at the period-one nonlinear dynamics works effectively as a photonic microwave local oscillator that generates a required microwave signal at $f_0 \neq f_m$ through an all-optical approach for the purpose of microwave mixing. When frequency unlocking happens between the oscillation sidebands of the period-one nonlinear dynamics and the modulation sidebands of the optical input, a nonlinear wave-mixing optical signal is generated. An optical filter is applied to select the desired optical frequency components, which are separated from each other by $|f_m-f_0|$, of the nonlinear wave-mixing optical signal. Therefore, an optical output, which is an optical signal carrying a frequency-converted microwave signal at $|f_m-f_0|$, is obtained, achieving microwave frequency conversion from $f_m$ to $|f_m-f_0|$. The semiconductor laser used in the apparatus and method of the present invention functions both as a microwave mixer and a microwave local oscillator at the same time. Because of the all-optical nature of the present invention, not only the needs for high-frequency yet expensive electronics are largely reduced, but also a considerably broad spectral range from a few gigahertz to hundreds of gigahertz can be achieved for either frequency upconversion or downconversion without suffering from the bandwidth limitation of electronics. These features make the apparatus and method of the present invention dynamically reconfigurable for different wireless communication networks requiring different operating microwave frequencies. In addition, since the frequency-converted microwave signal possesses a narrow linewidth and a low phase noise level, the apparatus and method of the present invention are beneficial to the next generation wireless systems to adopt advanced modulation formats for data transmission in order to further increase the communication capacity. Furthermore, compared with the optical modulation depth of the optical input which is typically lower than 10%, the optical modulation depth of the optical output can be made close to 100%. This indicates that, under the same optical power level received by a photodetector, the power of the frequency-converted microwave signal is significantly higher than that of the frequency-to-be-converted microwave signal. This in turn suggests that the present invention exhibits high conversion efficiency, which is advantageous in improving the detection sensitivity, fiber transmission distance, and link gain of a communication network.

According to the aforementioned purposes, the present invention provides a photonic microwave mixing apparatus which includes a photonic microwave mixing module to convert an optical input, which is an optical signal carrying a frequency-to-be-converted microwave signal, into an optical output, which is an optical signal carrying a frequency-converted microwave signal. The photonic microwave mixing module includes a microwave mixing laser. The optical power and carrier frequency of the optical input are adjusted so as to place the microwave mixing laser in period-one nonlinear dynamics and, at the same time, to achieve frequency unlocking between the modulation sidebands of the optical input and the oscillation sidebands of the period-one nonlinear dynamics. A nonlinear wave-mixing optical signal is therefore generated at the output of the microwave mixing laser.

Preferably, the photonic microwave mixing apparatus may include a microwave-modulated optical signal generation module to generate the optical input. The microwave-modulated optical signal generation module may include a laser to generate a continuous-wave optical signal, an optical polarization controller to adjust the polarization of the continuous-wave optical signal, a microwave signal generator to generate the frequency-to-be-converted microwave signal, and an optical modulator to superimpose the frequency-to-be-converted microwave signal onto the continuous-wave optical signal in order to generate the optical input.

Preferably, the photonic microwave mixing module may further include an optical power adjuster to adjust the optical power of the optical input and an optical polarization controller to adjust the polarization of the optical input before injecting the optical input into the microwave mixing laser.

Preferably, the optical power adjuster may include an active optical device or a passive optical device. The active optical device may be an optical power amplifier and the passive optical device may be an optical power attenuator.

Preferably, the photonic microwave mixing module may further include an optical path controller, connected to the microwave mixing laser, to unidirectionally direct the optical input toward the microwave mixing laser and also to unidirectionally direct the nonlinear wave-mixing optical signal toward an optical frequency component selector. The optical frequency component selector selects the optical frequency components of the nonlinear wave-mixing optical signal in order to generate the optical output.

Preferably, the optical path controller may be an optical circulator, the optical frequency component selector may be an optical filter, and the microwave mixing laser may be a semiconductor laser.

In addition, according to the aforementioned purposes, the present invention further provides a photonic microwave mixing method which includes the following steps:

(1) using a microwave-modulated optical signal generation module to generate an optical input which is an optical signal carrying a frequency-to-be-converted microwave signal, and (2) using a photonic microwave mixing module to convert the optical input into an optical output, which is an optical signal carrying a frequency-converted microwave signal. The photonic microwave mixing module includes a microwave mixing laser. The optical power and carrier frequency of the optical input are adjusted so as to place the microwave mixing laser in period-one nonlinear dynamics and, at the same time, to achieve frequency unlocking between the modulation sidebands of the optical input and the oscillation sidebands of the period-one nonlinear dynamics. A nonlinear wave-mixing optical signal is therefore generated at the output of the microwave mixing laser.

Preferably, the step of using the microwave-modulated optical signal generation module to generate the optical input may include steps of:

(1) using a laser to generate a continuous-wave optical signal, (2) using an optical polarization controller to adjust the polarization of the continuous-wave optical signal, (3) using a microwave signal generator to generate the frequency-to-be-converted microwave signal, and (4) using an optical modulator to superimpose the frequency-to-be-converted microwave signal on the continuous-wave optical signal in order to generate the optical input.

Preferably, four more steps may also be included between the step of using the microwave-modulated optical signal generation module to generate the optical input and the step of using the photonic microwave mixing module to convert the optical input into the optical output:

(1) using an optical power adjuster to adjust the optical power of the optical input, (2) using an optical polarization controller to adjust the polarization of the optical input, (3) using an optical path controller to unidirectionally direct the optical input toward the microwave mixing laser and also to unidirectionally direct the nonlinear wave-mixing optical signal toward an optical frequency component selector, and (4) using the optical frequency component selector to select the optical frequency components of the nonlinear wave-mixing optical signal in order to generate the optical output.

Accordingly, the photonic microwave mixing apparatus and method based upon the present invention possess one or more of the following characteristics and advantages:

(1) The photonic microwave mixing apparatus of the present invention only requires a typical and commercially available semiconductor laser as the key component, which could be a Fabry Perot laser, a distributed feedback laser, a vertical cavity surface emitting laser, a quantum-well laser, a quantum-dash laser, or a quantum-dot laser. No specific or high-speed semiconductor laser is necessary to carry out microwave mixing using the period-one nonlinear dynamics of the semiconductor laser.

(2) The semiconductor laser used in the apparatus and method of the present invention functions both as a microwave mixer and a microwave local oscillator at the same time. Because of the all-optical nature of the present invention, not only the needs for high-frequency yet expensive electronics are largely reduced, but also a considerably broad spectral range from a few gigahertz to hundreds of gigahertz can be achieved for either frequency upconversion or downconversion without suffering from the bandwidth limitation of electronics. These features make the apparatus and method of the present invention dynamically reconfigurable for different wireless communication networks requiring different operating microwave frequencies.

(3) Since the frequency-converted microwave signal possesses a narrow linewidth and a low phase noise level, the apparatus and method of the present invention are beneficial for the next generation wireless systems to adopt advanced modulation formats for data transmission in order to further increase the communication capacity.

(4) Compared with the optical modulation depth of the optical input which is typically lower than 10%, the optical modulation depth of the optical output can be made close to 100%. This indicates that, under the same optical power level received by a photodetector, the power of the frequency-converted microwave signal is significantly higher than that of the frequency-to-be-converted microwave signal. This in turn suggests that the present invention exhibits high conversion efficiency, which is advantageous in improving the detection sensitivity, fiber transmission distance, and link gain of a communication network.

BRIEF DESCRIPTION OF THE DRAWINGS

The device structure, operating principle, and advantageous characteristics of the present invention are described with more details hereinafter with reference to the accompanying drawings that show various embodiments of the present invention as follows.

DESCRIPTION OF THE PREFERRED EMBODIMENTS

To illustrate the device structure, operating principle, and advantageous characteristics of the present invention, a preferred embodiment and the corresponding drawings are provided with more details. The purpose of the drawings being used is for illustration, and they are not necessarily the real proportion and precise allocation of the embodiments of the present invention. Therefore, they should not be used to limit the privilege coverage of the practical embodiments of the present invention.

Figure 1:
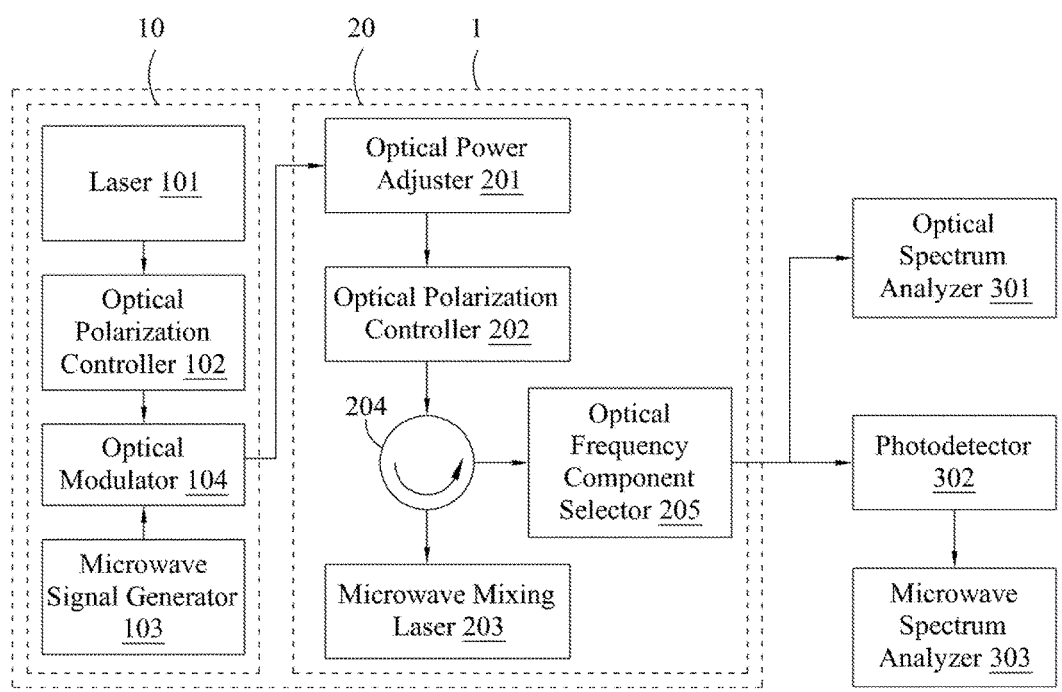
FIG. 1 is a schematic representation of a photonic microwave mixing apparatus according to a preferred embodiment of the present invention.
Figure 2:
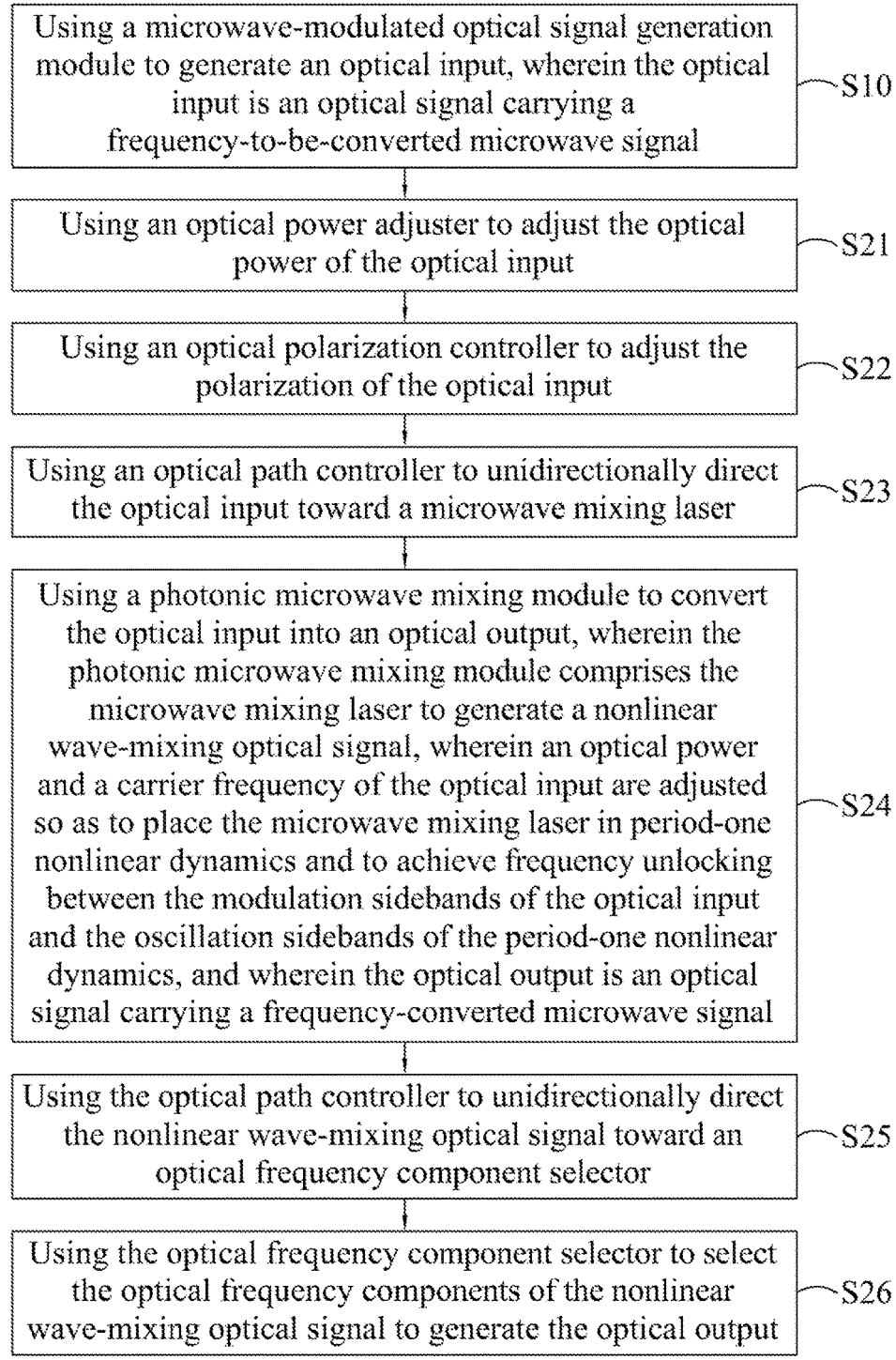
FIG. 2 is a first flow diagram showing a photonic microwave mixing method according to the preferred embodiment of the present invention.

Referring to FIG. 1, FIG. 1 is a schematic representation of a photonic microwave mixing apparatus according to a preferred embodiment of the present invention. As shown in FIG. 1, a photonic microwave mixing apparatus 1 includes a photonic microwave mixing module 20. The photonic microwave mixing module 20 converts an optical input, which is an optical signal carrying a frequency-to-be-converted microwave signal, into an optical output, which is an optical signal carrying a frequency-converted microwave signal. The photonic microwave mixing module 20 includes a microwave mixing laser 203. The optical power and carrier frequency of the optical input are adjusted so as to place the microwave mixing laser 203 in period-one nonlinear dynamics and, at the same time, to achieve frequency unlocking between the modulation sidebands of the optical input and the oscillation sidebands of the period-one nonlinear dynamics. A nonlinear wave-mixing optical signal is therefore generated at the output of the microwave mixing laser 203.

The photonic microwave mixing apparatus 1 may further include a microwave-modulated optical signal generation module 10 to generate the optical input.

Figure 4:
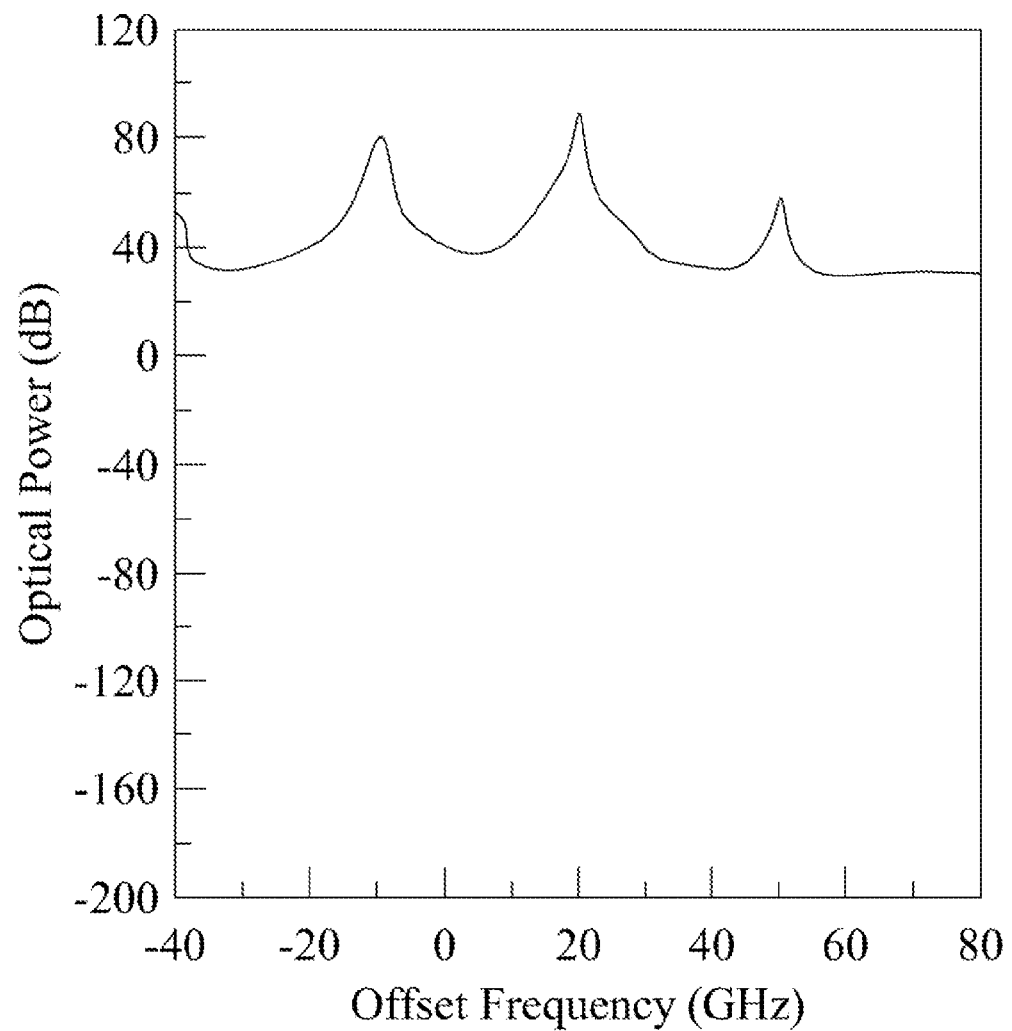
FIG. 4 shows an optical spectrum of a period-one nonlinear dynamical state when a microwave mixing laser is subject to an injection of a continuous-wave optical signal according to the preferred embodiment of the present invention. The x-axis is relative to the free-running frequency of the microwave mixing laser.
Figure 5:
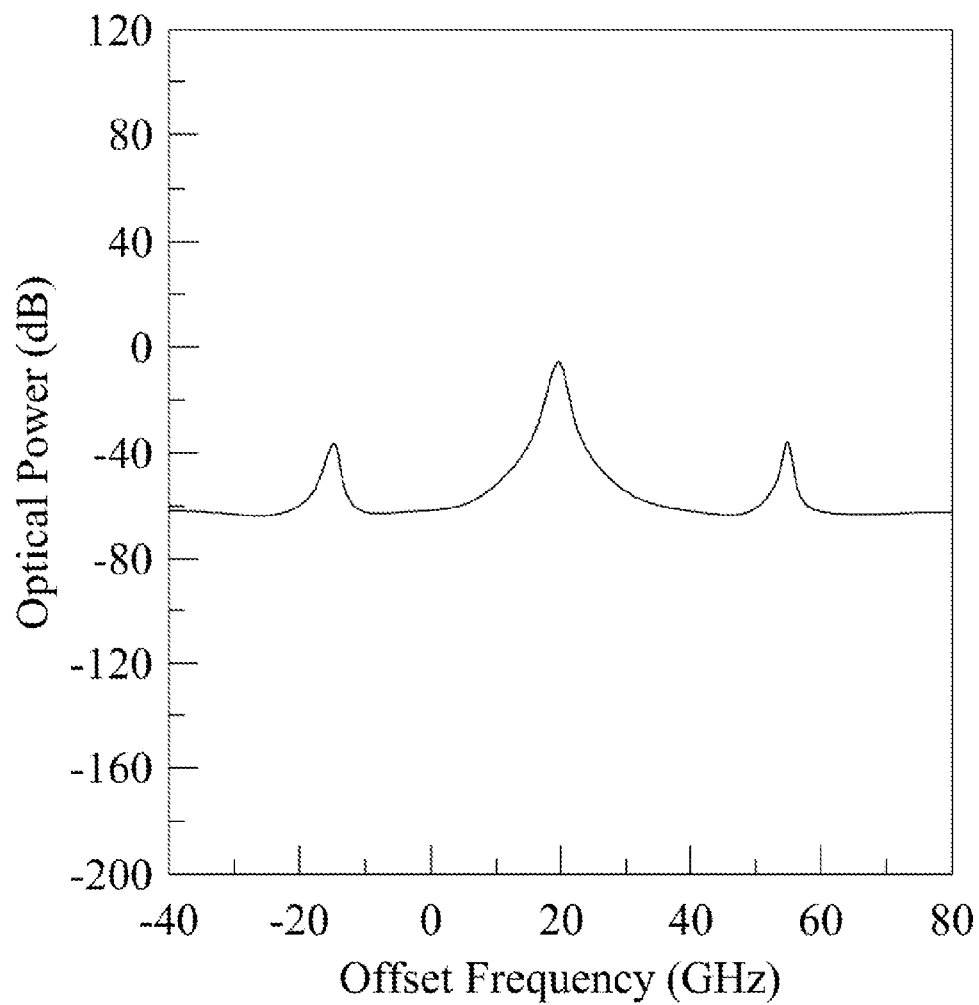
FIG. 5 shows an optical spectrum of an optical input, which is an optical signal carrying a microwave signal generated by a microwave-modulated optical signal generation module, according to the preferred embodiment of the present invention. The x-axis is relative to the free-running frequency of the microwave mixing laser.
Figure 6:
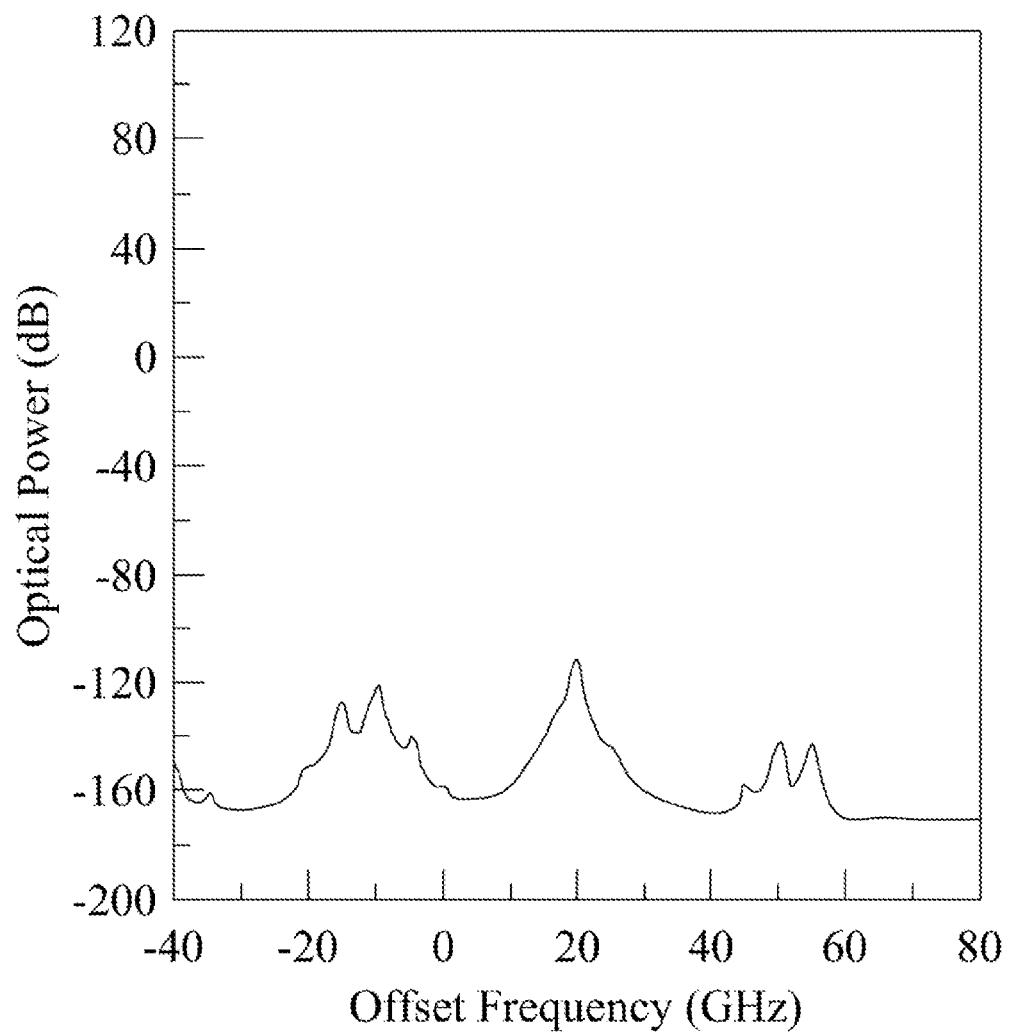
FIG. 6 shows an optical spectrum of a nonlinear wave-mixing optical signal when the microwave mixing laser is subject to an injection of the optical input according to the preferred embodiment of the present invention. The x-axis is relative to the free-running frequency of the microwave mixing laser.
Figure 7:
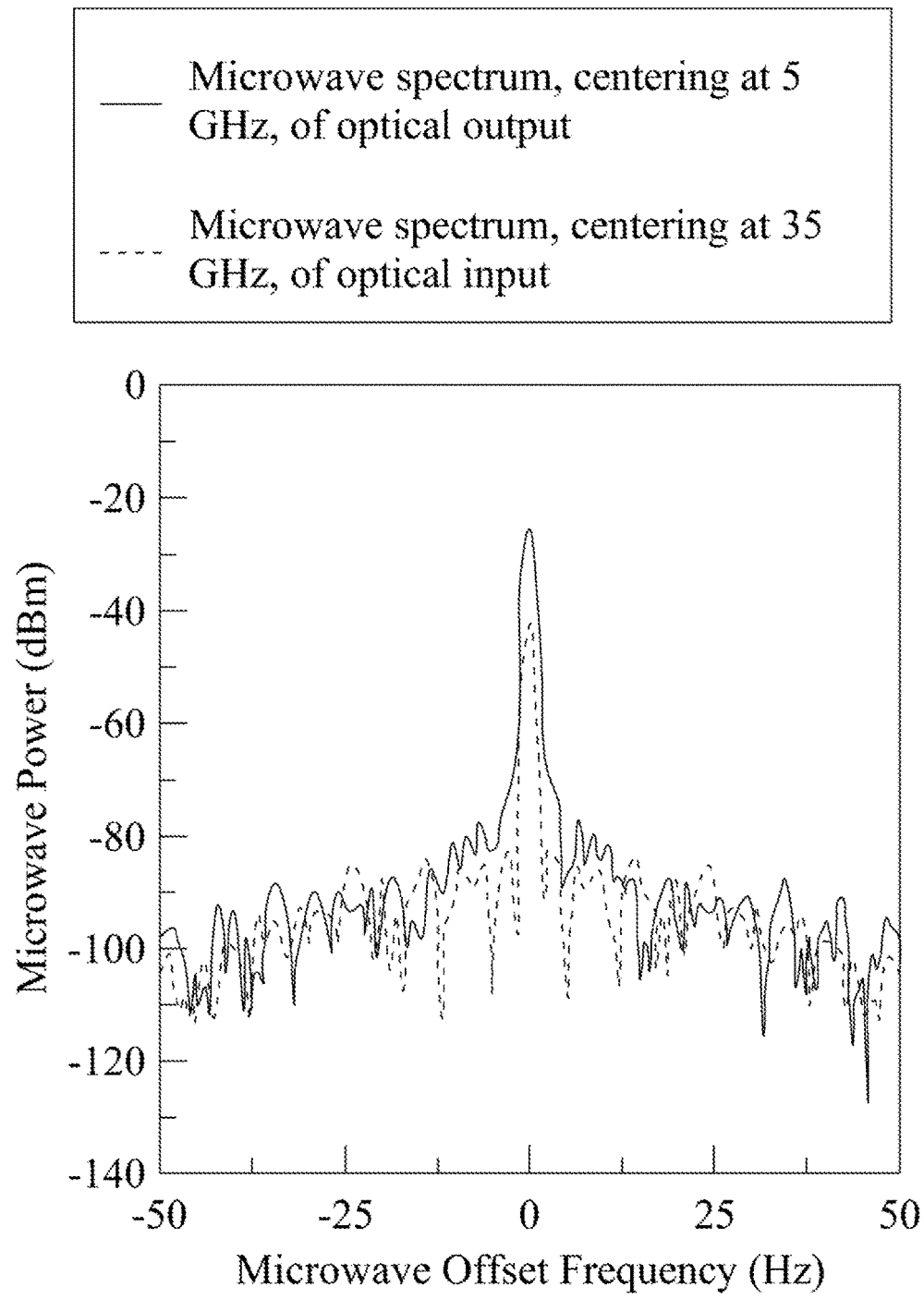
FIG. 7 shows a microwave spectrum, centering at 5 GHz, of the optical output, and a microwave spectrum, centering at 35 GHz, of the optical input according to the preferred embodiment of the present invention.
Figure 8:
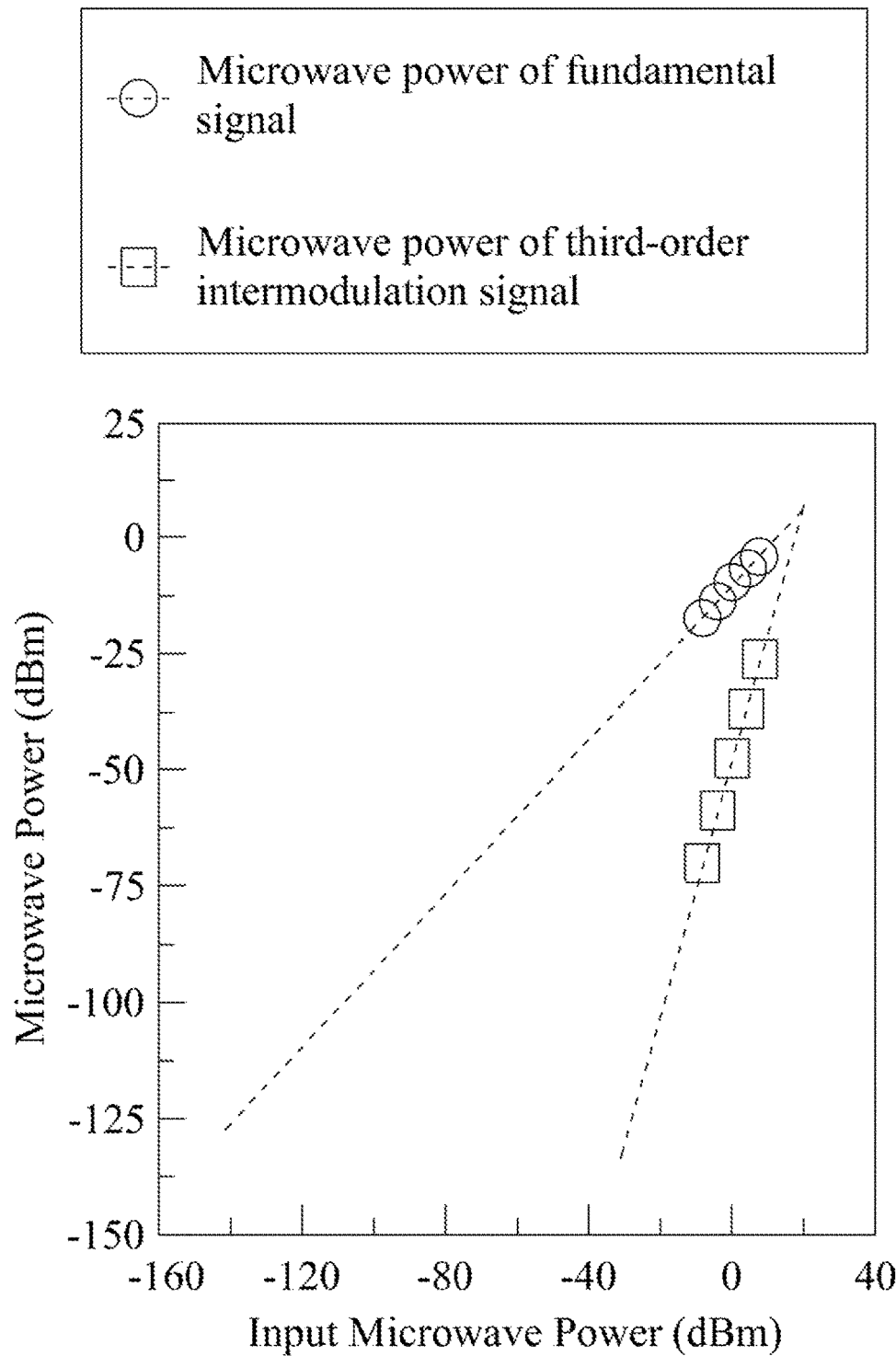
FIG. 8 shows microwave power of a fundamental signal and a third-order intermodulation signal in terms of the input microwave power according to the preferred embodiment of the present invention.

Referring to FIG. 1 and FIG. 4 to FIG. 8, FIG. 4 shows an optical spectrum of a period-one nonlinear dynamical state when the microwave mixing laser 203 is subject to an injection of a continuous-wave optical signal according to the preferred embodiment of the present invention, FIG. 5 shows an optical spectrum of the optical input generated by the microwave-modulated optical signal generation module 10 according to the preferred embodiment of the present invention, FIG. 6 shows an optical spectrum of the nonlinear wave-mixing optical signal when the microwave mixing laser 203 is subject to the injection of the optical input according to the preferred embodiment of the present invention, FIG. 7 shows a microwave spectrum of the optical output and a microwave spectrum of the optical input according to the preferred embodiment of the present invention, and FIG. 8 shows microwave power of a fundamental signal and a third-order intermodulation signal in terms of the input microwave power according to the preferred embodiment of the present invention. In the following explanations, the injection strength, $\xi_i$, indicates the power of an optical injection signal relative to that of the microwave mixing laser 203, and the detuning frequency, $f_i$, indicates the frequency of the optical injection signal relative to the free-running frequency of the microwave mixing laser 203. The optical injection signal can be a continuous-wave optical signal or a microwave-modulated optical signal. The microwave mixing laser 203 may be a semiconductor laser, which can be a Fabry Perot laser, a distributed feedback laser, a vertical cavity surface emitting laser, a quantum-well laser, a quantum-dash laser, or a quantum-dot laser.

Under proper injection conditions of $\xi_i$ and $f_i$, the microwave generation laser 203 subject to an injection of a continuous-wave optical signal can be operated in the period-one nonlinear dynamics. While the optical injection regenerates, oscillation sidebands that are equally separated from the regeneration by an oscillation frequency, $f_0$, sharply emerge. Attributed to the cavity resonance red-shift induced by the optical injection, the lower-frequency oscillation sideband has a power that is not only much higher than the upper-frequency oscillation sideband but is also close to the regeneration. Since the oscillation frequency $f_0$ can be tuned within the microwave band (between 0.3 and 300 GHz) by simply adjusting $\xi_i$ and $f_i$, sending the output optical signal of the microwave mixing laser 203 operating at the period-one nonlinear dynamics into a photodetector generates a microwave signal at $f_0$. Therefore, the microwave-mixing laser 203 operating at the period-one nonlinear dynamics is effectively a photonic microwave signal generator by itself, which can be used as a microwave local oscillator, a photonic yet all-optical one, for the purpose of in this invention. The photonic microwave mixing apparatus and method of the present invention take advantage of the above-mentioned characteristics to conduct microwave frequency conversion. For example, FIG. 4 shows an optical spectrum of a period-one nonlinear dynamical state when the microwave mixing laser 203 is subject to an injection of a continuous-wave optical signal at $\xi_i=1.00$ and $f_i=21$ GHz. In addition to the regeneration of the continuous-wave optical signal at the offset frequency of 21 GHz, two oscillation sidebands sharply emerge at the offset frequency of −9 GHz and 51 GHz, respectively. The oscillation frequency $f_0$ of the period-one nonlinear dynamics state is therefore 30 GHz, suggesting that the microwave mixing laser 203 operating at the period-one nonlinear dynamics can work as a 30-GHz microwave local oscillator for the purpose of the present invention. Since the oscillation frequency $f_0$ of the period-one nonlinear dynamics can be broadly and continuously adjusted from a few gigahertz to hundreds of gigahertz by simply changing $\xi_i$ and $f_i$, the photonic microwave mixing apparatus 1 can be so dynamically reconfigured that the photonic microwave mixing laser 203 works as a frequency-tunable microwave local oscillator, which provides high flexibility and adjustability for practical applications when a different operating microwave frequency is required for a different wireless communication network. Therefore, frequency upconversion or downconversion over a considerably broad spectral range from a few gigahertz to hundreds of gigahertz can be achieved without suffering from the bandwidth limitation of typical electronics, making the photonic microwave mixing apparatus and method of the present invention dynamically reconfigurable for different wireless communication networks requiring different operating microwave frequencies.

For the purpose of the present invention, instead of using a continuous-wave optical signal to excite the period-one nonlinear dynamics of the microwave mixing laser 203, the optical input generated by the microwave-modulated optical signal generation module 10 is used. In FIG. 5 of the present embodiment, the optical input generated by the microwave-modulated optical signal generation module 10 may be an optical double-sideband signal. The frequency component of the optical double-sideband signal at the center is commonly referred to as the optical carrier. The two frequency components that possess the same optical power and appear away from the optical carrier by a modulation frequency $f_m$ are commonly referred to as the modulation sidebands. For the purpose of the present invention, the modulation frequency $f_m$ of the optical input needs to be different from the oscillation frequency $f_0$ of the period-one nonlinear dynamics.

As an example, the microwave-modulated optical signal generation module 10 may include a laser 101, an optical polarization controller 102, a microwave signal generator 103, and an optical modulator 104. The laser 101, which can be a tunable laser, generates a continuous-wave optical signal of a specific frequency and a specific power according to the operating requirement. To change the power of the continuous-wave optical signal, an optical power adjuster (not shown in FIG. 1) that is externally attached to or internally built inside the laser 101 can also be used. The optical polarization controller 102 receives the continuous-wave optical signal, adjusts the polarization of the continuous-wave optical signal, and outputs the continuous-wave optical signal.

In addition, the microwave signal generator 103 generates the frequency-to-be-converted microwave signal at $f_m$ which is different from the oscillation frequency $f_0$ of the period-one nonlinear dynamics. For example, since $f_0$ is 30 GHz in FIG. 4 of the present embodiment, $f_m$ is chosen to be 5 GHz in FIG. 5 of the present embodiment. A different modulation frequency $f_m$ which may be adopted by a different wireless communication network, such as 10, 20, 30, or 40 GHz, can also be frequency-converted by taking advantage of the same period-one nonlinear dynamical state shown in FIG. 4 of the present embodiment.

Furthermore, the optical modulator 104 receives the continuous-wave optical signal and the frequency-to-be-converted microwave signal, and superimposes the frequency-to-be-converted microwave signal onto the continuous-wave optical signal to generate the optical input shown in FIG. 5.

In addition to the microwave mixing laser 203, the photonic microwave mixing module 20 may also include an optical power adjuster 201 and an optical polarization controller 202. The optical power adjuster 201 receives and adjusts the power of the optical input generated by the microwave-modulated optical signal generation module 10 in order to change the injection strength $\xi_i$. Varying the frequency of the continuous-wave optical signal generated by the laser 101 or the frequency of the output optical signal generated by the microwave mixing laser 203 changes the detuning frequency $f_i$. The frequency separation between the frequency components (i.e., the oscillation frequency $f_0$) or the power of each frequency component of the period-one nonlinear dynamics can be changed by adjusting either $\xi_i$ or $f_i$. Different characteristics of the period-one nonlinear dynamics can therefore be generated by the microwave mixing laser 203. The optical power adjuster 201 may include an active optical device and/or a passive optical device to adjust the power of the optical input. The active optical device may be an optical power amplifier and the passive optical device may be an optical power attenuator. If the power of the optical input generated by the microwave-modulated optical signal generation module 10 is adequately high, the optical power adjuster 201 only needs an optical power attenuator to achieve the power adjustment.

The optical polarization controller 202, connected to the optical power adjuster 201, receives the optical input after power adjustment by the optical power adjuster 201 and adjusts the polarization of the optical input so that the polarization of the optical input is aligned with that of the microwave mixing laser 203 in order to maximize the optical injection efficiency. After the polarization adjustment, the optical input is sent toward the microwave mixing laser 203.

The photonic microwave mixing module 20 may also include an optical path controller 204, connected to the microwave mixing laser 203, to unidirectionally direct the optical input toward the microwave mixing laser 203, and also to unidirectionally direct the nonlinear wave-mixing optical signal of the microwave-mixing laser 203 toward an optical frequency component selector 205. The optical frequency component selector 205 selects the optical frequency components of the nonlinear wave-mixing optical signal so that the optical output carries a microwave signal at a frequency equal to the difference between the modulation frequency $f_m$ of the frequency-to-be-converted microwave signal and the oscillation frequency $f_0$ of the period-one nonlinear dynamical state. Since the frequency of the microwave signal carried by the optical output is lower (or higher) than that of the microwave signal carried by the optical input, microwave frequency downconversion (or up conversion) is achieved. The optical path controller 204 may be an optical circulator, and the optical frequency component selector 205 may be an optical filter. The optical output of the photonic microwave mixing module 20 can be split into two beams by an optical coupler (not shown in FIG. 1). The two beams are sent into an optical spectrum analyzer 301 and a photodetector 302 followed by a microwave spectrum analyzer 303, respectively, to analyze the optical and microwave spectra of the optical output.

To preserve the data quality after microwave frequency conversion, the linewidth and phase noise of the frequency-converted microwave signal need to be similar to those of the frequency-to-be-converted microwave signal. This requires a high level of the optical phase correlation between the laser 101 and the microwave mixing laser 203. If such a high-level phase correlation does not exist to begin with, a microwave stabilization technique may be needed to establish the required level of the optical phase correlation. Since the laser 101 and the microwave-mixing laser 203 used for the demonstration in the preferred embodiment of the present invention are not phase-correlated, a microwave stabilization technique based on doubling locking is adopted here. That is, a microwave signal generator (not shown in FIG. 1) is used to generate a microwave signal at a frequency equal to $f_0$, which is used to directly modulate the microwave mixing laser 203 so as to phase-lock the period-one nonlinear dynamics by the microwave signal. For example, for the period-one dynamical state shown in FIG. 4, a 30-GHz microwave signal can be applied to directly yet slightly modulate the microwave mixing laser 203 to establish the required level of the optical phase correlation.

The following example demonstrates microwave frequency downconversion from 35 GHz to 5 GHz according to the preferred embodiment of the present invention for uplink transmission in a radio-over-fiber communication network. As the procedure described above, an optical input carrying a frequency-to-be-converted microwave signal at 35 GHz, as shown in FIG. 5, can be generated by superimposing a 35-GHz microwave signal generated by the microwave generator 103 onto a continuous-wave optical signal generated by the laser 101 through the optical modulator 104. The optical power of the modulation sidebands is typically much lower than that of the optical carrier. The optical power difference between the modulation sidebands and the optical carrier is about 30 dB in this demonstration according to the preferred embodiment of the present invention, indicating an optical modulation depth of 6%. As shown in FIG. 6, by injecting the optical input into the microwave mixing laser 203 under the same injection condition of $(\xi_i, f_i)=(1.00, 21 \text{ GHz})$ considered in FIG. 4, the optical carrier of the optical input invokes a period-one nonlinear dynamical state with frequency components closely similar to the one shown in FIG. 4, where the optical carrier of the optical input regenerates at the offset frequency of 21 GHz and two oscillation sidebands sharply emerge at the offset frequency of −9 and 51 GHz, respectively. Meanwhile, since the optical modulation depth of the optical input is low, no frequency locking happens between the modulation sidebands of the optical input and the oscillation sidebands of the period-one nonlinear dynamical state. Accordingly, not only the two modulation sidebands as well regenerate themselves at the offset frequency of −14 and 56 GHz, respectively, but also other frequency components appear owing to the nonlinear wave-mixing occurred inside the microwave mixing laser 203, leading to the generation of a nonlinear wave-mixing optical signal. Hence, for the purpose of the present invention, the microwave mixing laser 203 operating at the period-one nonlinear dynamical state functions not only as a photonic microwave local oscillator but also as a photonic microwave mixer. The nonlinear wave-mixing optical signal is sent through the optical frequency component selector 205 in order to select the lower-frequency oscillation sideband of the period-one nonlinear dynamical state at the offset frequency of −9 GHz and the regeneration of the lower-frequency modulation sideband of the optical input at the offset frequency of −14 GHz. In this manner, an optical signal carrying a microwave signal at $|f_m - f_0| = 5$ GHz is generated at the output of the optical frequency component selector 205. As shown in FIG. 7, by sending the optical output into the photodetector 302, a microwave signal at 5 GHz with a linewidth of less than 1 Hz is obtained, therefore achieving frequency downconversion from $f_m$ to $|f_m - f_0|$. In addition, since the optical power difference between the lower-frequency oscillation sideband of the period-one nonlinear dynamical state and the regeneration of the lower-frequency modulation sideband of the optical input is 7 dB, this indicates that the optical output possesses an optical modulation depth of 90%. Under the same optical power level received by the photodetector 302, the frequency-converted microwave signal at 5 GHz therefore has a power 18-dB higher than the frequency-to-be-converted microwave signal at 35 GHz, suggesting a conversion efficiency of 18 dB according to the preferred embodiment of the present invention. Note that the offset frequencies shown in the x-axis of FIG. 7 are relative to 35 GHz for the microwave spectrum of the frequency-to-be-converted microwave signal at 35 GHz and are relative to 5 GHz for the microwave spectrum of the frequency-converted microwave signal at 5 GHz, respectively.

The linearity of the photonic microwave mixing apparatus of the present invention for microwave frequency downconversion is demonstrated by analyzing its spur-free dynamic range. This is done by generating an optical input that carries two microwave signals of the same power but different frequencies at $f_{m1}=35$ GHz and $f_{m2}=35.02$ GHz, respectively, through the microwave-modulated optical signal generation module 10, and by injecting such an optical input into the microwave mixing laser 203 under the same injection condition of $(\xi_i, f_i)=(1.00, 21 \text{ GHz})$ considered in FIG. 4 and FIG. 6. Similar to the process described above, a nonlinear wave-mixing optical signal is generated accordingly at the output of the microwave mixing laser 203. After selecting the optical components of such a nonlinear wave-mixing optical signal using the optical frequency component selector 205 and photodetecting the selected nonlinear wave-mixing optical signal at the photodetector 302, two fundamental signals at $f_{m1}-f_0=5$ GHz and $f_{m2}-f_0=5.02$ GHz, respectively, and two third-order intermodulation signals at $2f_{m1}-f_{m2}-f_0=4.98$ GHz and $2f_{m2}-f_{m1}-f_0=5.04$ GHz, respectively, appear. FIG. 8 shows the microwave power of the fundamental signal at $f_{m1}-f_0=5$ GHz and the third-order intermodulation signal at $2f_{m1}-f_{m2}-f_0=4.98$ GHz in terms of the input microwave power. Considering that the extrapolated noise floor of the microwave spectrum analyzer 303 is about −130 dBm, a spur-free dynamic range better than the minimum required level for practical applications is therefore achieved.

Figure 10:
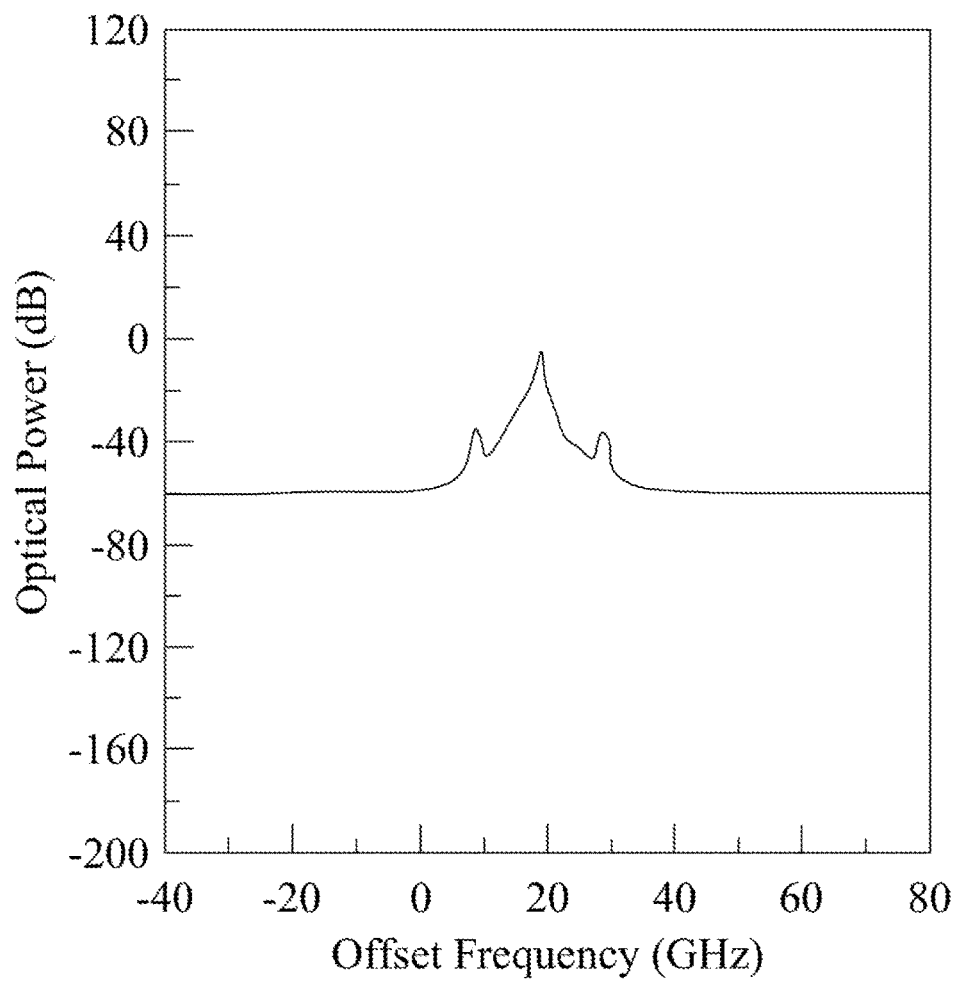
FIG. 10 shows an optical spectrum of an optical input, which is an optical signal carrying a microwave signal generated by a microwave-modulated optical signal generation module, according to the preferred embodiment of the present invention. The x-axis is relative to the free-running frequency of the microwave mixing laser.
Figure 11:
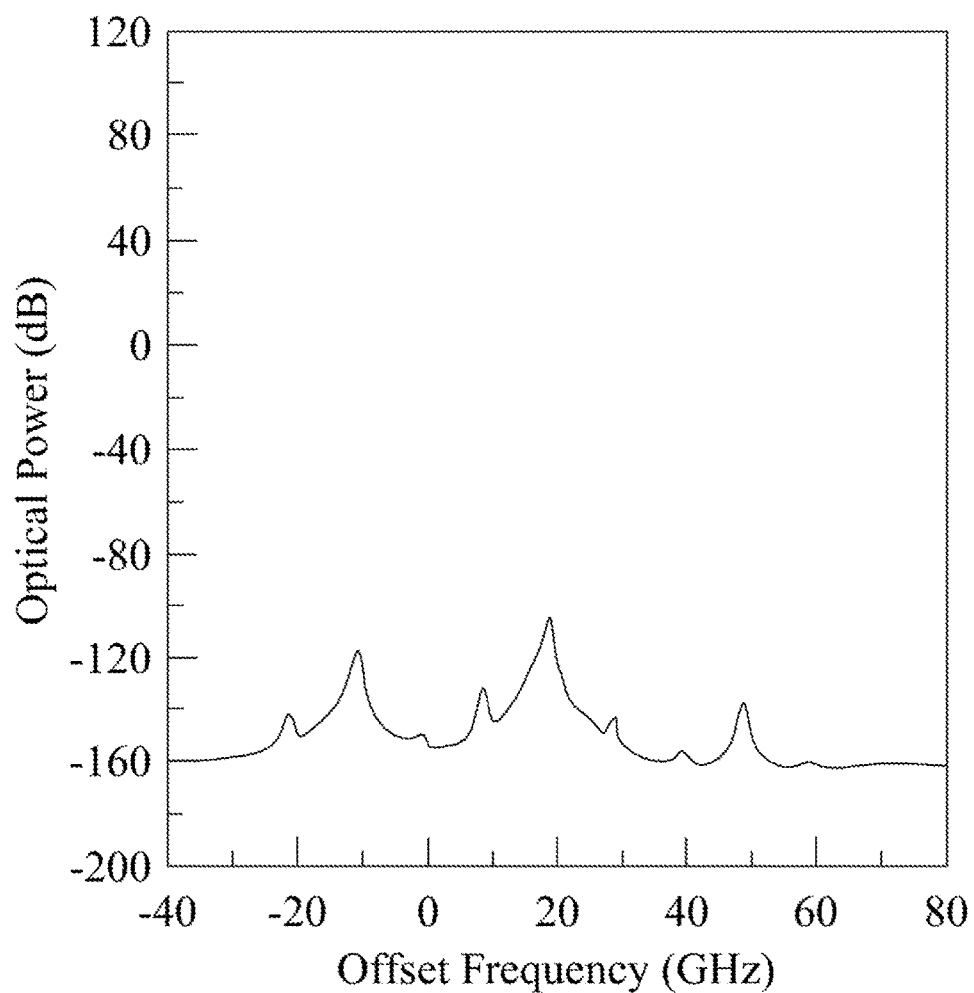
FIG. 11 shows an optical spectrum of a nonlinear wave-mixing optical signal when the microwave mixing laser is subject to an injection of the optical input according to the preferred embodiment of the present invention. The x-axis is relative to the free-running frequency of the microwave mixing laser.
Figure 12:
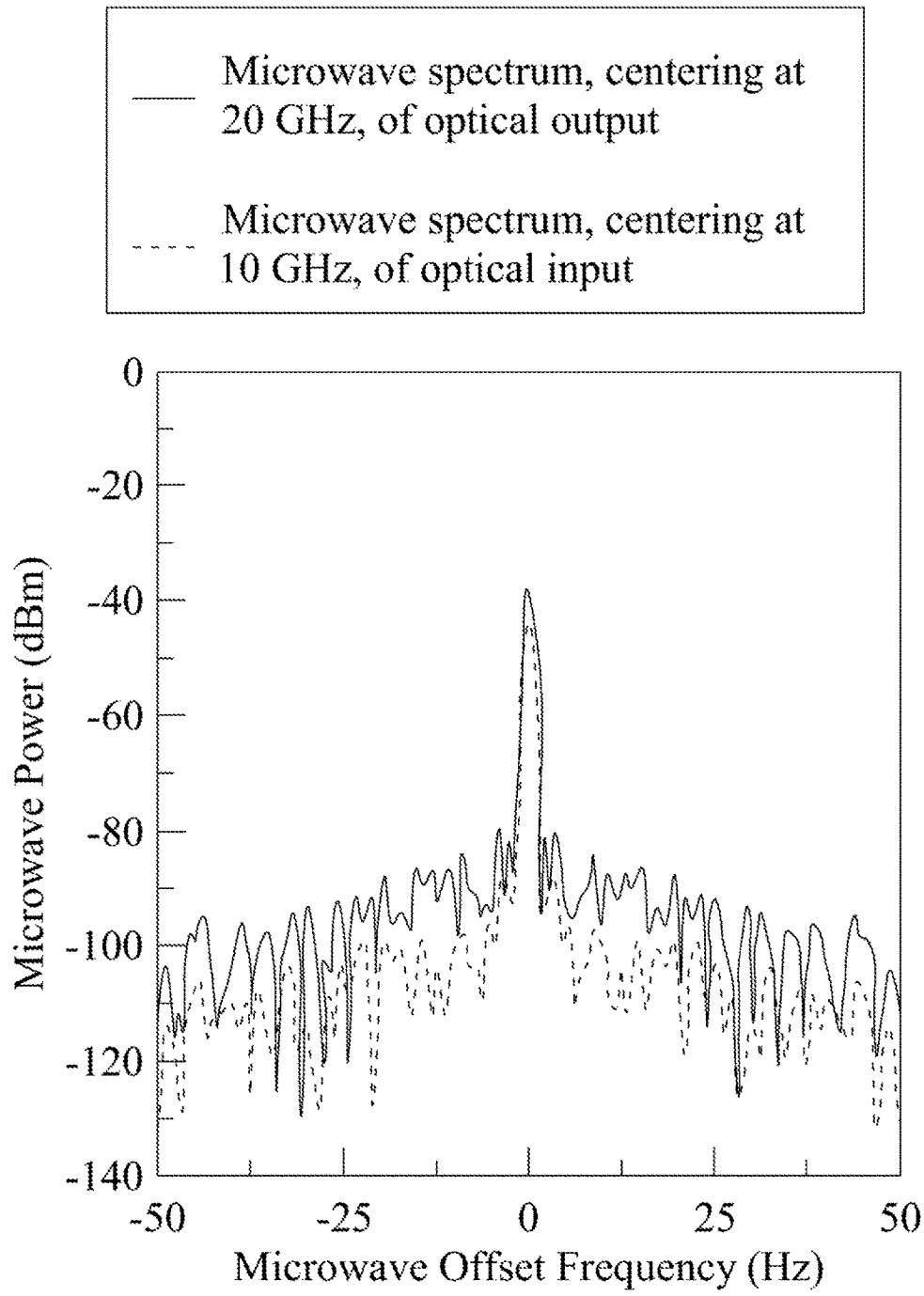
FIG. 12 shows a microwave spectrum, centering at 20 GHz, of the optical output, and a microwave spectrum, centering at 10 GHz, of the optical input according to the preferred embodiment of the present invention.
Figure 13:
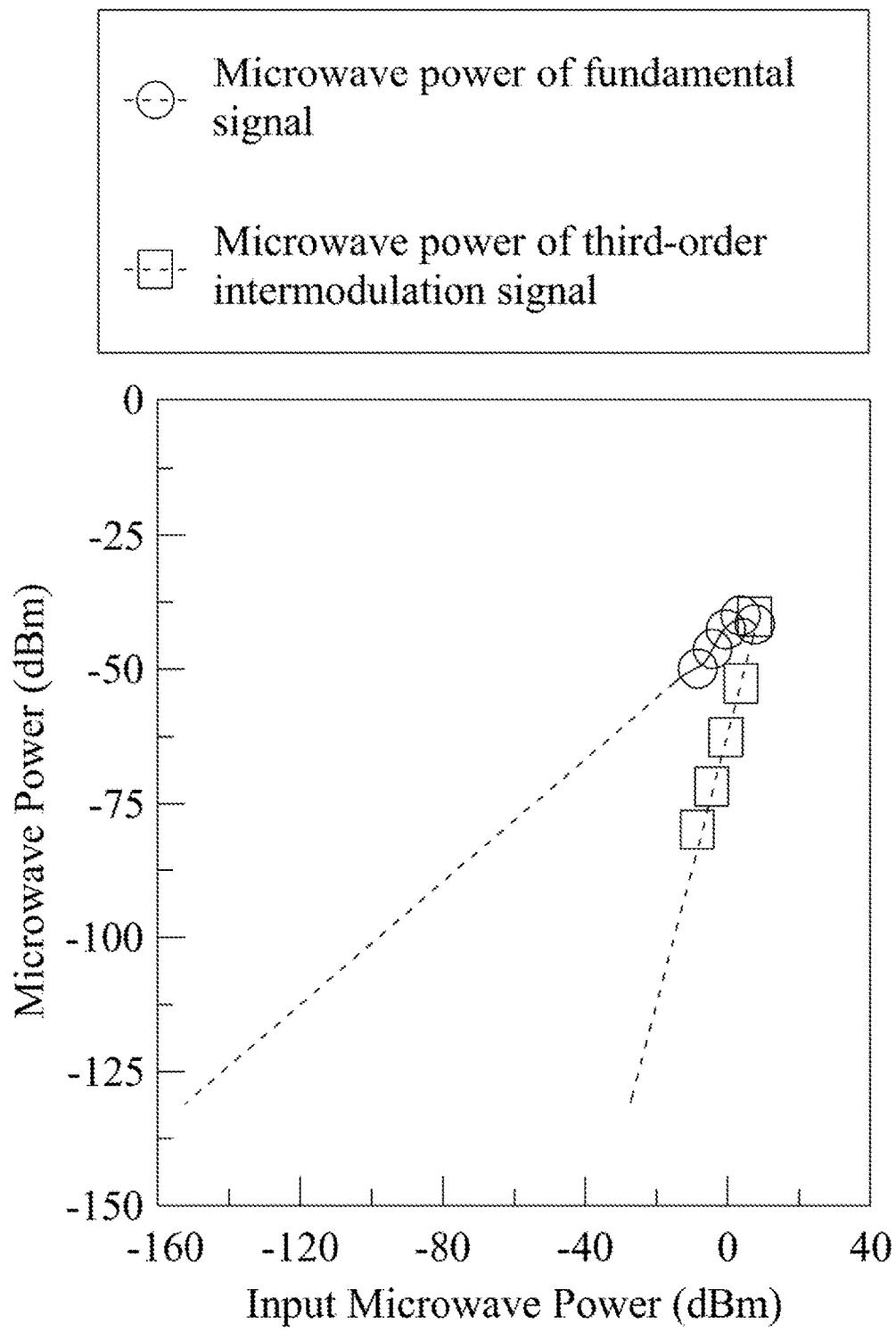
FIG. 13 shows microwave power of a fundamental signal and a third-order intermodulation signal in terms of the input microwave power according to the preferred embodiment of the present invention.

The photonic microwave mixing apparatus of the present invention can also be applied to microwave frequency upconversion for downlink transmission in a radio-over-fiber communication network. Referring to FIG. 1 and FIG. 9 to FIG. 13, FIG. 9 shows an optical spectrum of a period-one nonlinear dynamical state when the microwave mixing laser 203 is subject to an injection of a continuous-wave optical signal according to the preferred embodiment of the present invention, FIG. 10 shows an optical spectrum of the optical input generated by the microwave-modulated optical signal generation module 10 according to the preferred embodiment of the present invention, FIG. 11 shows an optical spectrum of the nonlinear wave-mixing optical signal when the microwave mixing laser 203 is subject to an injection of the optical input according to the preferred embodiment of the present invention, FIG. 12 shows a microwave spectrum of the optical output and a microwave spectrum of the optical input according to the preferred embodiment of the present invention, and FIG. 13 shows microwave power of a fundamental signal and a third-order intermodulation signal in terms of the input microwave power according to the preferred embodiment of the present invention.

Figure 9:
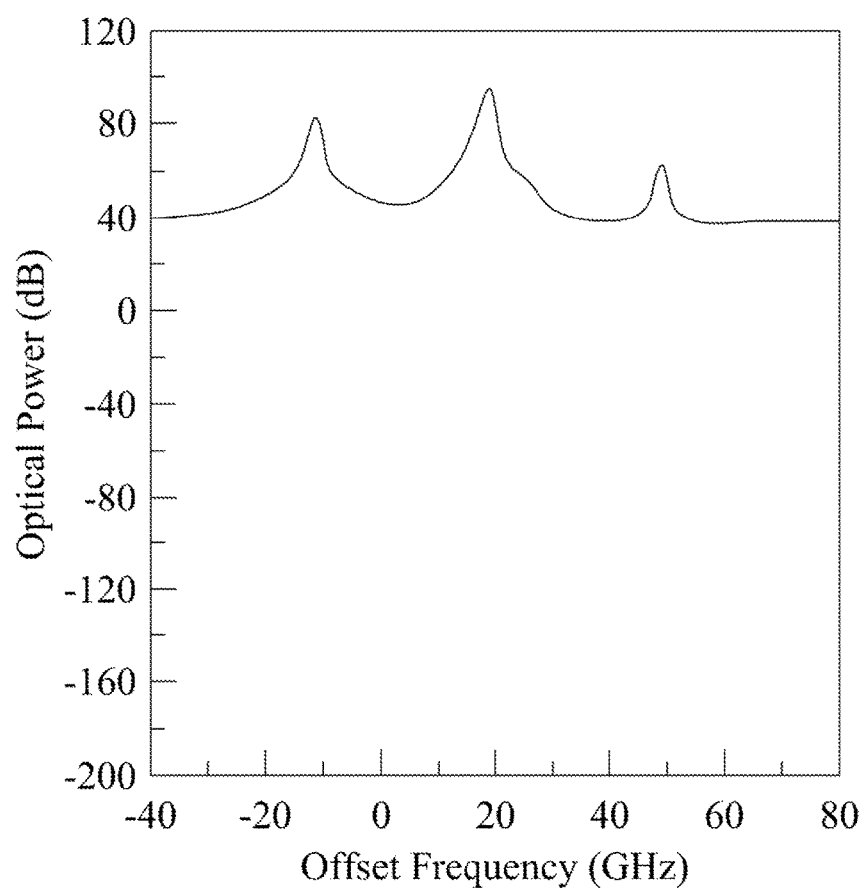
FIG. 9 shows an optical spectrum of a period-one nonlinear dynamical state when a microwave mixing laser is subject to an injection of a continuous-wave optical signal according to the preferred embodiment of the present invention. The x-axis is relative to the free-running frequency of the microwave mixing laser.

For example, FIG. 9 shows a period-one nonlinear dynamical state when the microwave mixing laser 203 is subject to an injection of a continuous-wave optical signal at $\xi_i=1.19$ and $f_i=18$ GHz. In addition to the regeneration of the continuous-wave optical signal at the offset frequency of 18 GHz, two oscillation sidebands sharply emerge at the offset frequency of −12 GHz and 48 GHz, respectively, leading to an oscillation frequency of $f_0=30$ GHz. For frequency upconversion from 10 GHz to 20 GHz, an optical input carrying a frequency-to-be-converted microwave signal at 10 GHz, as shown in FIG. 10, can be generated by superimposing a 10-GHz microwave signal generated by the microwave generator 103 onto a continuous-wave optical signal generated by the laser 101 through the optical modulator 104, as the procedure described above. The optical power difference between the modulation sidebands and the optical carrier of the optical input is about 30 dB in this demonstration according to the preferred embodiment of the present invention, indicating an optical modulation depth of 6%. As shown in FIG. 11, by injecting the optical input into the microwave mixing laser 203 under the same injection condition of $(\xi_i, f_i)=(1.19, 18$ GHz$)$ considered in FIG. 9, the optical carrier of the optical input invokes a period-one nonlinear dynamical state with frequency components closely similar to the one shown in FIG. 9, where the optical carrier of the optical input regenerates at the offset frequency of 18 GHz and two oscillation sidebands sharply emerge at the offset frequency of −12 and 48 GHz, respectively. Meanwhile, since the optical modulation depth of the optical input is low, no frequency locking happens between the modulation sidebands of the optical input and the oscillation sidebands of the period-one nonlinear dynamical state. Accordingly, not only the two modulation sidebands as well regenerate themselves at the offset frequency of 8 and 28 GHz, respectively, but also other frequency components appear owing to the nonlinear wave-mixing occurred inside the microwave mixing laser 203, leading to the generation of a nonlinear wave-mixing optical signal. The nonlinear wave-mixing optical signal is sent through the optical frequency component selector 205 in order to select the lower-frequency oscillation sideband of the period-one nonlinear dynamical state at the offset frequency of −12 GHz and the regeneration of the lower-frequency modulation sideband of the optical input at the offset frequency of 8 GHz. In this manner, an optical signal carrying a microwave signal at $|f_m-f_0|=20$ GHz is generated at the output of the optical frequency component selector 205. As shown in FIG. 12, by sending the optical output into the photodetector 302, a microwave signal at 20 GHz with a linewidth of less than 1 Hz is obtained, therefore achieving frequency upconversion from $f_m$ to $|f_m-f_0|$. In addition, since the optical power difference between the lower-frequency oscillation sideband of the period-one nonlinear dynamical state and the regeneration of the lower-frequency modulation sideband of the optical input is 14 dB, this indicates that the optical output possesses an optical modulation depth of 40%. Under the same optical power level received by the photodetector 302, the frequency-converted microwave signal at 20 GHz therefore has a power 6-dB higher than the frequency-to-be-converted microwave signal at 10 GHz, suggesting a conversion efficiency of 6 dB according to the preferred embodiment of the present invention. Note that the offset frequencies shown in the x-axis of FIG. 12 are relative to 10 GHz for the microwave spectrum of the frequency-to-be-converted microwave signal at 10 GHz and are relative to 20 GHz for the microwave spectrum of the frequency-converted microwave signal at 20 GHz, respectively.

The linearity of the photonic microwave mixing apparatus of the present invention for microwave frequency upconversion is demonstrated again by analyzing its spur-free dynamic range. This is done by generating an optical input carrying two microwave signals of the same power but different frequencies at $f_{m1}=10$ GHz and $f_{m2}=10.02$ GHz, respectively, through the microwave-modulated optical signal generation module 10, and by injecting such an optical input into the microwave mixing laser 203 under the same injection condition of $(\xi_i, f_i)=(1.19, 18$ GHz$)$ considered in FIG. 9 and FIG. 11. Similar to the process described above, a nonlinear wave-mixing optical signal is generated accordingly at the output of the microwave mixing laser 203. After selecting the optical components of such a nonlinear wave-mixing optical signal using the optical frequency component selector 205 and photodetecting the selected nonlinear wave-mixing optical signal at the photodetector 302, two fundamental signals at $f_0-f_{m1}=20$ GHz and $f_0-f_{m2}=19.98$ GHz, respectively, and two third-order intermodulation signals at $f_0-2f_{m1}+f_{m2}=20.02$ GHz and $f_02f_{m2}+f_{m1}=19.96$ GHz, respectively, appear. FIG. 13 shows the microwave power of the fundamental signal at $f_0-f_{m1}=20$ GHz and the third-order intermodulation signal at $f_0-2f_{m1}+f_{m2}=20.02$ GHz in terms of the input microwave power. Considering that the extrapolated noise floor of the microwave spectrum analyzer 303 is about −130 dBm, a spur-free dynamic range better than the minimum required level for practical applications is therefore achieved.

Figure 14:
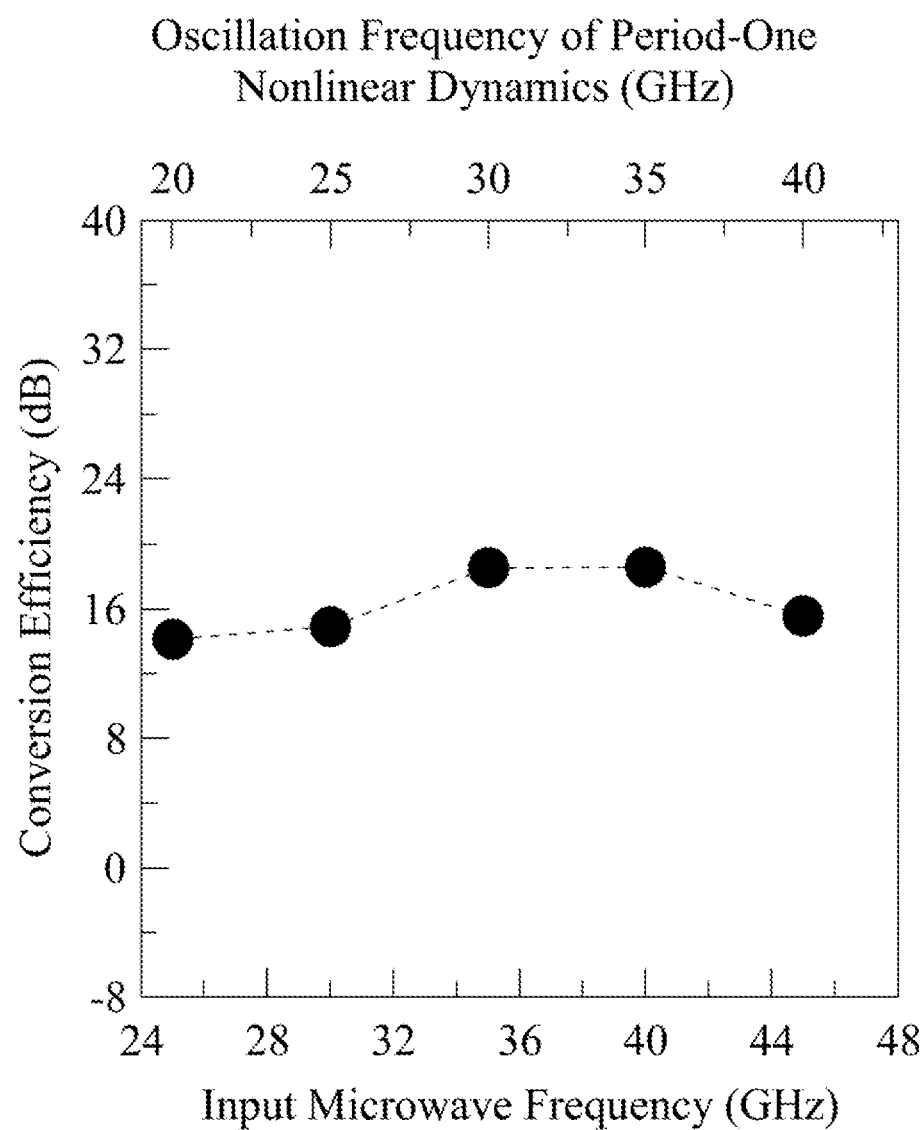
FIG. 14 shows conversion efficiency in terms of the input microwave frequency according to the preferred embodiment of the present invention
Figure 15:
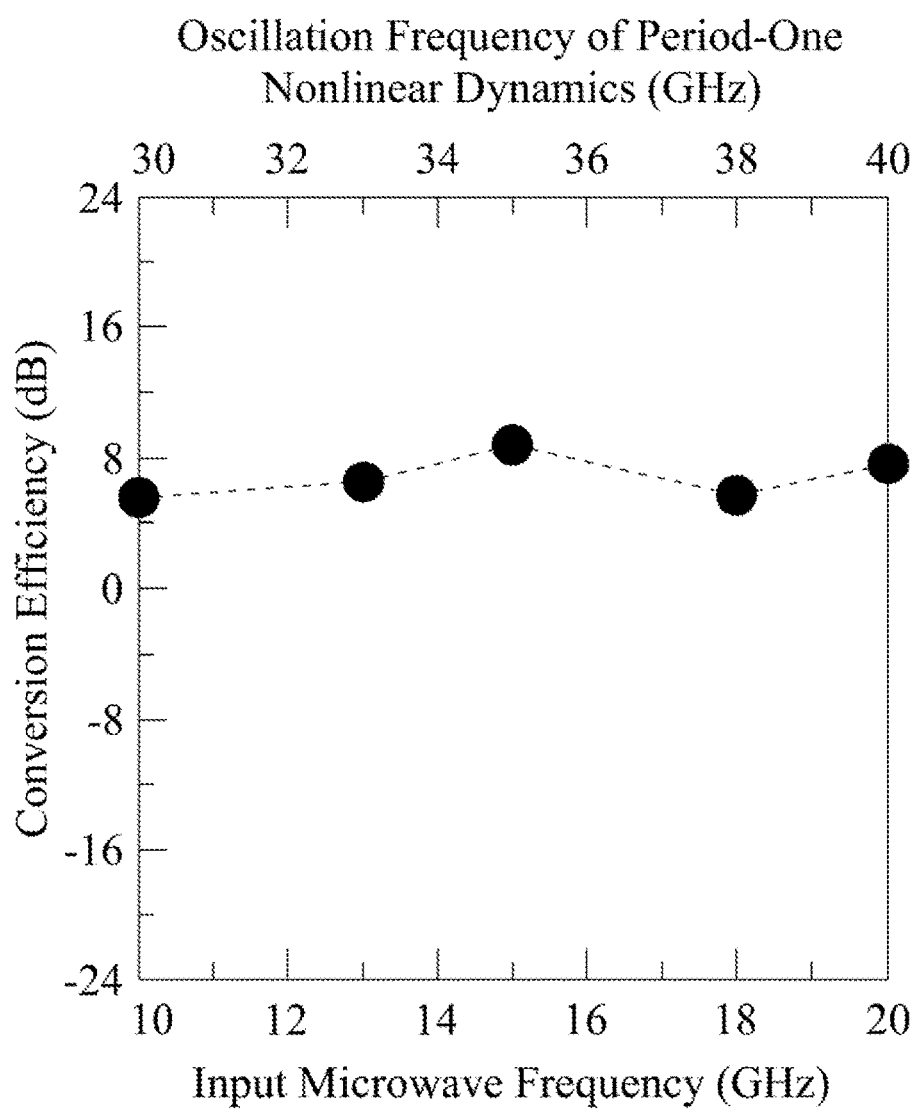
FIG. 15 shows conversion efficiency in terms of the input microwave frequency according to the preferred embodiment of the present invention.

Since the oscillation frequency $f_0$ and the power of each frequency component of the period-one nonlinear dynamics can be changed by adjusting either $\xi_i$ or $f_i$, the photonic microwave mixing apparatus and method of the present invention can generate a period-one nonlinear dynamical state of different characteristics (i.e., $f_0$ and optical power of each optical component) by choosing a different combination of $\xi_i$ and $f_i$ in order to meet a different operating requirement in practical applications. Hence, both the conversion efficiency of the present invention and the frequency of the converted microwave signal can be dynamically reconfigured for different wireless communication networks requiring different operating microwave frequencies. Taking frequency downconversion as an example, a microwave signal at $f_m=35$ GHz is frequency-converted to a microwave signal at $|f_m-f_0|=5$ GHz with a conversion efficiency of 18 dB by taking advantage of the period-one dynamical state at $f_0=30$ GHz excited at $(\xi_i, f_i)=(1.00, 21$ GHz$)$, as shown in FIG. 14. Similarly, microwave signals at $f_m=25, 30, 40, 45$ GHz, respectively, can be frequency-converted to microwave signals all at $|f_m-f_0|=5$ GHz with a conversion efficiency of about 20 dB when the microwave-mixing laser 203 is operated at period-one nonlinear dynamical states at $f_0=20, 25, 35,$ and 40 GHz, respectively, as shown in FIG. 14. Taking frequency upconversion as another example, a microwave signal at $f_m=10$ GHz is frequency-converted to a microwave signal at $|f_m-f_0|=20$ GHz with a conversion efficiency of 6 dB by taking advantage of the period-one dynamical state at $f_0=30$ GHz excited at $(\xi_i, f_i)=(1.19, 18$ GHz$)$, as shown in FIG. 15. Similarly, microwave signals at $f_m=13, 15, 18, 20$ GHz, respectively, can be frequency-converted to microwave signals all at $|f_m-f_0|=20$ GHz with a conversion efficiency of about 8 dB when the microwave-mixing laser 203 is operated at period-one nonlinear dynamical states at $f_0=33, 35, 38,$ and 40 GHz, respectively, as shown in FIG. 15.

Even though the above explanations also describe the photonic microwave generation method of the present invention, more explanations are provided as follows for further clarifications. Wherein, the details described above can be the reference in the photonic microwave generation method of the present invention.

Figure 3:
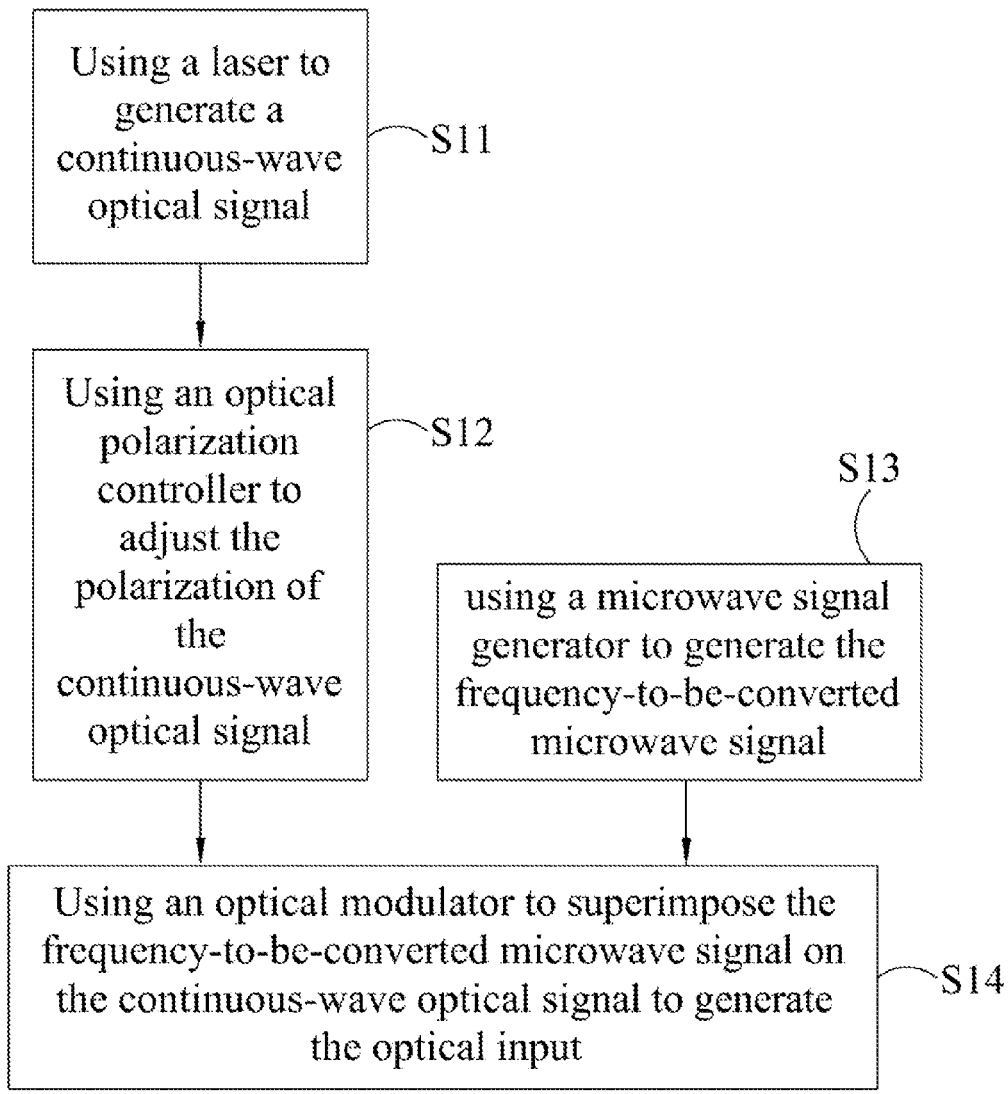
FIG. 3 is a second flow diagram showing the photonic microwave mixing method according to the preferred embodiment of the present invention.

Referring to FIG. 1 to FIG. 5, FIG. 9, and FIG. 10, FIG. 2 is a first flow diagram showing a photonic microwave mixing method according to the preferred embodiment of the present invention, and FIG. 3 is a second flow diagram showing the photonic microwave mixing method according to the preferred embodiment of the present invention. As shown in FIG. 1 to FIG. 5, FIG. 9, and FIG. 10, the photonic microwave mixing method of the present invention first uses a microwave-modulated optical signal generation module 10 to generate an optical input which is an optical signal carrying a frequency-converted microwave signal. (Step S10), and next sends the optical input generated by the microwave-modulated optical signal generation module 10 into a photonic microwave mixing module 20 including a microwave mixing laser 203. The optical power and carrier frequency of the optical input are adjusted so as to place the microwave mixing laser 203 in period-one nonlinear dynamics and, at the same time, to achieve frequency unlocking between the oscillation sidebands of the period-one nonlinear dynamics and the modulation sidebands of the optical input. As a result, a nonlinear wave-mixing optical signal is generated by the microwave mixing laser 203. (Step S24).

Step S10 may further include the following steps:

Step S11: using a laser 101 to generate a continuous-wave optical signal;

Step S12: using an optical polarization controller 102 to adjust the polarization of the continuous-wave optical signal;

Step S13: using a microwave signal generator 103 to generate the frequency-to-be-converted microwave signal; and Step S14: using an optical modulator 104 to first receives the frequency-to-be-converted microwave signal from the microwave signal generator 103 and the continuous-wave optical signal after polarization adjustment, and next to superimpose the frequency-to-be-converted microwave signal onto the continuous-wave optical signal to generate the optical input.

Between Step S10 and Step S24, an optical power adjuster 201 can be used to adjust the optical power of the optical input generated by the microwave-modulated optical signal generation module 10 (Step S21). In addition, an optical polarization controller 202 can be used to adjust the polarization of the optical input after the power adjustment (Step S22).

Moreover, between Step S10 and Step S24, an optical path controller 204 can be used to unidirectionally direct the optical input toward the microwave mixing laser 203 (Step 23). Following Step S24, the same optical path controller 204 can be used to unidirectionally direct the nonlinear wave-mixing optical signal of the microwave mixing laser 203 toward an optical frequency component selector 205 (Step 25). The frequency component selector 205 is used to select the optical components of the nonlinear wave-mixing optical signal in order to generate an optical output which is an optical signal carrying a frequency-converted microwave signal (Step 26).

Based on the above explanations and descriptions, the photonic microwave mixing apparatus and method of the present invention use a semiconductor laser as the microwave mixing laser 203. Without any external perturbation, the typical output of a semiconductor laser is a continuous wave of one single frequency. Under proper conditions of the injection strength and detuning frequency, injecting a continuous-wave optical signal into the microwave mixing laser 203 induces the period-one nonlinear dynamics, showing completely different physical behaviors and characteristics. The present invention takes advantage of these unique characteristics of the period-one nonlinear dynamics to carry out microwave mixing for microwave frequency conversion. Since microwave frequency upconversion or downconversion over a considerably broad spectral range, from a few gigahertz to hundreds of gigahertz, can be achieved, the apparatus and method of the present invention can be dynamically reconfigured for different wireless communication networks requiring different operating microwave frequencies. In addition, since the frequency-converted microwave signal possesses a narrow linewidth and a low phase noise level, the apparatus and method of the present invention are beneficial to the next generation wireless systems to adopt advanced modulation formats for data transmission in order to further increase the communication capacity. Furthermore, since the power of the frequency-converted microwave signal is significantly higher than that of the frequency-to-be-converted microwave signal, the present invention exhibits high conversion efficiency, which is advantageous in improving the detection sensitivity, fiber transmission distance, and link gain of a communication network.

It should be understood that the present invention is not limited to the details thereof. Various equivalent variations and modifications may still occur to those skilled in this art in view of the teachings of the present invention. Thus, all such variations and equivalent modifications are also embraced within the scope of the present invention as defined in the appended claims.

What is claimed is:

1. A photonic microwave mixing apparatus, comprising:
   an optical input, wherein the optical input is an optical signal carrying a frequency-to-be-converted microwave signal;
   an optical output, wherein the optical output is an optical signal carrying a frequency-converted microwave signal; and
   a photonic microwave mixing module to convert the optical input into the optical output, wherein the photonic microwave mixing module comprises a microwave mixing laser to generate a nonlinear wave-mixing optical signal, and wherein an optical power and a carrier frequency of the optical input are adjusted so as to place the microwave mixing laser in period-one nonlinear dynamics and to achieve frequency unlocking between the modulation sidebands of the optical input and the oscillation sidebands of the period-one nonlinear dynamics.

2. The photonic microwave mixing apparatus of claim 1, further comprising a microwave-modulated optical signal generation module to generate the optical input, wherein the microwave-modulated optical signal generation module comprises:
   a laser, generating a continuous-wave optical signal;
   an optical polarization controller, adjusting the polarization of the continuous-wave optical signal;
   a microwave signal generator, generating the frequency-to-be-converted microwave signal; and
   an optical modulator, superimposing the frequency-to-be-converted microwave signal on the continuous-wave optical signal to generate the optical input.

3. The photonic microwave mixing apparatus of claim 1, wherein the photonic microwave mixing module further comprises:

an optical power adjuster, adjusting the optical power of the optical input; and an optical polarization controller, adjusting the polarization of the optical input.

4. The photonic microwave mixing apparatus of claim 3, wherein the optical power adjuster further comprises an active optical device or a passive optical device, and wherein the active optical device is an optical power amplifier and the passive optical device is an optical power attenuator.

5. The photonic microwave mixing apparatus of claim 1, wherein the photonic microwave mixing module further comprises:

an optical path controller to unidirectionally direct the optical input toward the microwave mixing laser and to unidirectionally direct the nonlinear wave-mixing optical signal toward an optical frequency component selector, wherein the optical frequency component selector selects the optical frequency components of the nonlinear wave-mixing optical signal to generate the optical output.

6. The photonic microwave mixing apparatus of claim 5, wherein the optical path controller is an optical circulator, the optical frequency component selector is an optical filter, and the microwave mixing laser is a semiconductor laser.

7. A photonic microwave mixing method, comprising steps of:

using a microwave-modulated optical signal generation module to generate an optical input, wherein the optical input is an optical signal carrying a frequency-to-be-converted microwave signal; and using a photonic microwave mixing module to convert the optical input into an optical output, wherein the photonic microwave mixing module comprises a microwave mixing laser to generate a nonlinear wave-mixing optical signal, wherein an optical power and a carrier frequency of the optical input are adjusted so as to place the microwave mixing laser in period-one nonlinear dynamics and to achieve frequency unlocking between the modulation sidebands of the optical input and the oscillation sidebands of the period-one nonlinear dynamics, and wherein the optical output is an optical signal carrying a frequency-converted microwave signal.

8. The photonic microwave mixing method of claim 7, wherein the step of using the microwave-modulated optical signal generation module to generate the optical input comprises steps of:

using a laser to generate a continuous-wave optical signal;

using an optical polarization controller to adjust the polarization of the continuous-wave optical signal;

using a microwave signal generator to generate the frequency-to-be-converted microwave signal; and using an optical modulator to superimpose the frequency-to-be-converted microwave signal on the continuous-wave optical signal to generate the optical input.

9. The photonic microwave mixing method of claim 7, further comprising steps between the step of using the microwave-modulated optical signal generation module to generate the optical input and the step of using the photonic microwave mixing module to convert the optical input into the optical output of:

using an optical power adjuster to adjust the optical power of the optical input;

using an optical polarization controller to adjust the polarization of the optical input;

using an optical path controller to unidirectionally direct the optical input toward the microwave mixing laser and to unidirectionally direct the nonlinear wave-mixing optical signal toward an optical frequency component selector; and using the optical frequency component selector to select the optical frequency components of the nonlinear wave-mixing optical signal to generate the optical output.

* * * * *

UNITED STATES PATENT AND TRADEMARK OFFICE
CERTIFICATE OF CORRECTION

PATENT NO. : 10,116,395 B2
APPLICATION NO. : 15/432037
DATED : October 30, 2018
INVENTOR(S) : Sheng-Kwang Hwang and Yu-Han Hung It is certified that error appears in the above-identified patent and that said Letters Patent is hereby corrected as shown below:

On the Title Page

Column 1, Item (73) The assignee "National Chung Cheng University" should read "National Cheng Kung University"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*